(No Model.)
G. W. BROWN.
ENGINE REGISTER CONNECTION.
No. 263,844. Patented Sept. 5, 1882.
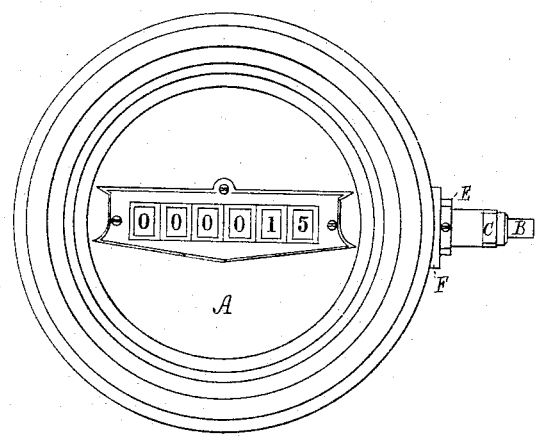
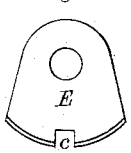
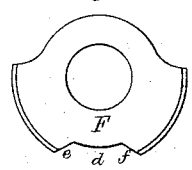
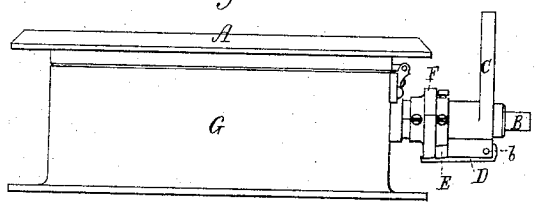
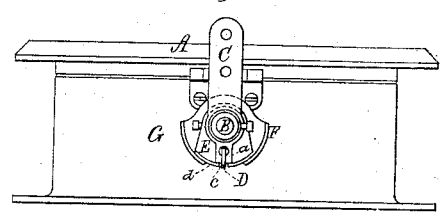
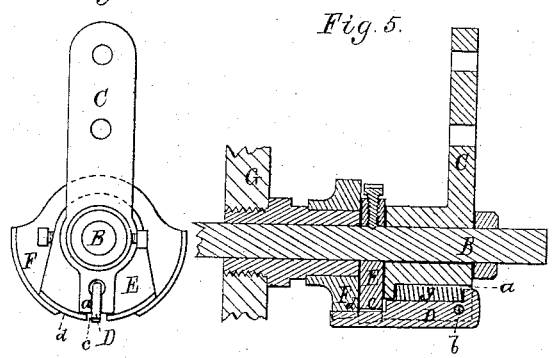
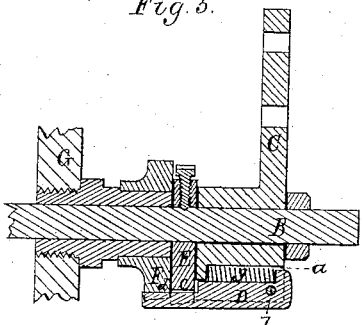
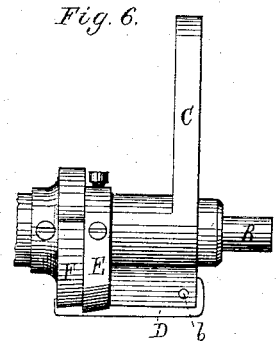
Witnesses
J. N. Piper
E. B. Pratt
Inventor,
Gilman W. Brown.
by R. H. Eddy, att'y.

UNITED STATES PATENT OFFICE.

GILMAN W. BROWN, OF WEST NEWBURY, ASSIGNOR TO THE CROSBY STEAM GAGE AND VALVE COMPANY, OF BOSTON, MASSACHUSETTS.

ENGINE-REGISTER CONNECTION.

SPECIFICATION forming part of Letters Patent No. 263,844, dated September 5, 1882.

Application filed May 1, 1882. (No model.)

*To all whom it may concern:*

Be it known that I, GILMAN W. BROWN, of West Newbury, in the county of Essex, of the State of Massachusetts, have invented a new and useful improvement in mechanism for intermittently revolving the shaft of a steam-engine counter or recorder, or apparatus for indicating the number of strokes made by the piston of such engine in any given period of time; and I do hereby declare the same to be described in the following specification and represented in the accompanying drawings, of which—

Figure 1 is a top view, and Fig. 2 a side elevation, and Fig. 3 a front elevation, of a counter with my improvement. Fig. 4 is a front view, Fig. 5 a vertical and longitudinal section, and Fig. 6 a side elevation, on an enlarged scale, of the mechanism constituting my invention. Fig. 7 is a front view of its movable notched sector, and Fig. 8 is a front view of its stationary cammed sector, to be described.

The engine recorder, or "counter," as it is usually termed, shown at A, is in common use and well known, its construction constituting no part of my invention. Its operative shaft is shown at B, my said invention being to impart to such shaft its correct intermittent rotary motion, no matter what may be the length of stroke of the piston. Were the crank of such shaft to have a ratchet-and-pawl connection with the shaft, the extent of such rotary movement of the shaft would vary as the length of the stroke of the piston might vary. Consequently the apparatus would be liable to register incorrectly. With my improvement the counter or register becomes applicable generally, or to most steam-engines, the length of stroke of the piston not governing in any way the extent of each advance rotary movement of the shaft, which is always constant and takes place during each stroke of the piston. The crank C is a lever, which, pivoted on the shaft B, turns freely thereon, and carries in a slot, a, in its shorter arm a pawl, D, shaped as shown and pivoted to the said arm, the pivot being represented at b. The said pawl extends through a notch, c, made in the periphery of a sector, E, fixed permanently on the shaft and alongside of the crank or lever. Furthermore, the pawl extends beyond the said sector and into a cammed notch, d, made, as represented, in a stationary sector, F, arranged as shown, and fastened to the case G of the counter. The said notch d terminates in two cams or inclined planes, e f, arranged as exhibited in Fig. 8. A spring, g, suitably applied to the pawl, serves to force it upward and to admit of its moving downward.

From the above it will be seen that on the lever C being reciprocated on the shaft the pawl, while in the notch c, will be caused to revolve the sector E, which, by being fastened to the shaft, will correspondingly revolve it; but as the pawl moves in the cammed notch d each of the cams e and f of said notch will, as the pawl may pass along it, force the pawl out of the notch c and allow the lever to continue to move without causing rotary motion of the shaft. From this it will be seen that, no matter what the length of the stroke of the piston may be beyond what may be necessary to cause the pawl to move through the notch d, the shaft will be revolved a like distance in each advance movement of the lever or crank, whereby the counter will be caused to correctly register or indicate the number of strokes made by the piston in any given period of time.

What I claim as my invention is as follows, viz:

The combination of the stationary sector F, having the cammed notch d, with the notched sector E, fixed on the shaft B, and with the vibratory crank or lever C, applied to turn on the shaft, and provided with the pawl D, to operate with the said two sectors as described, all being substantially and for the purpose as set forth.

GILMAN W. BROWN.

Witnesses:
R. H. EDDY,
E. B. PRATT.